United States Patent Office 3,481,152
Patented Dec. 2, 1969

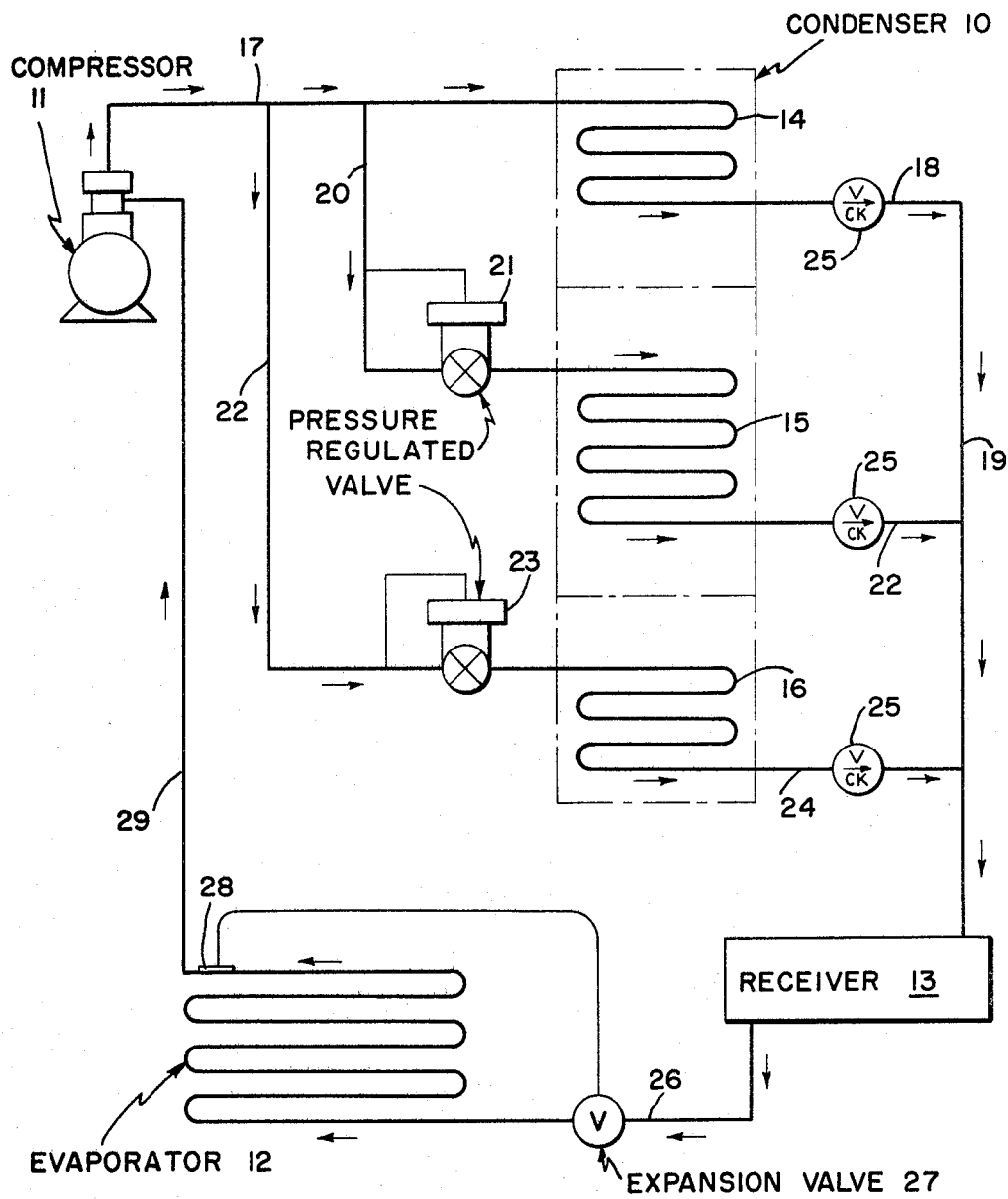

3,481,152
CONDENSER HEAD PRESSURE CONTROL SYSTEM
William M. Seeley, Quincy, Pa., assignor to Frick Company, Waynesboro, Pa., a corporation of Pennsylvania
Filed Jan. 18, 1968, Ser. No. 698,951
Int. Cl. F25b 41/04, 39/04
U.S. Cl. 62—196                    3 Claims

ABSTRACT OF THE DISCLOSURE

A condenser head pressure control system for an air conditioning or refrigeration system comprising a plurality of condensing tube banks or coils connected in parallel to receive compressed, gaseous refrigerant to be condensed and pass condensed refrigerant to a place of use or storage. A first condensing coil is constructed and arranged to provide the necessary heat transfer capacity to maintain a predetermined minimum head pressure at an extremely low load or ambient air temperature condition for the locality where the system is installed. A valve means is associated with each of the other condensing coils to allow flow of refrigerant to be condensed to the other coils at successively higher head pressures to thereby provide the balance of the condensing capacity required above the low load or low ambient temperature condition.

---

This invention relates to air conditioning and refrigeration systems and, more particularly, to means for controlling head pressure in the condenser means.

In air conditioning or refrigeration systems employing air cooled, atmospheric or evaporative condensers, the condensers are required to operate under varying ambient air conditions and under varying load conditions. It is, therefore, necessary that a control system be used to assure sufficient head pressure for satisfactory operation of the thermostatic expansion valve at low ambient temperature or reduced load conditions. Such air conditioning or refrigeration systems must provide some means for maintaining a predetermined condenser head pressure when ambient temperatures and loads are low. There are various condenser head pressure control systems presently being employed. One such control system provides for backing up liquid refrigerant or flooding the coil in the condenser which reduces the efficiency of the condenser; therefore, reducing its capacity and increasing the head pressure. Another control system provides for throttling the discharge from the condenser to the receiver and automatically maintaining discharge pressure to apply a predetermined pressure on the top of the liquid in the receiver. While the various head pressure control systems successfully function to provide the desired effect, the piping and control components, such as pressure regulating valves, are relatively complex and expensive.

Accordingly, it is an object of this invention to provide a condenser head pressure control system which is relatively simple and inexpensive.

It is another object of the present invention to provide a condenser head pressure control system which does not require the flooding of the condenser with liquid refrigerant.

It is, therefore, contemplated by this invention to provide a condenser head pressure control system comprising a plurality of condensing tube banks or coils connected in parallel to receive compressed, gaseous refrigerant to be condensed. One condensing coil is sized to provide the necessary heat transfer capacity to maintain a predetermined minimum head pressure at an extremely low load or ambient air temperature condition for the locality where installed, the balance of the condensing load required above the low load or ambient air temperature condition being provided by one or more additional condensing coils. Each of the additional circuits is provided with a pressure responsive control valve which is adjusted to open at a predetermined pressure value above the predetermined minimum head pressure. The control valves of the plurality of circuits are preset at successively higher pressure values above minimum head pressure to provide the required condensing capacity in relation to load and ambient temperature conditions. Check valve means is also provided in the condensing circuits to prevent reverse flow of liquid refrigerant in the condensing circuits.

The above and other objectives and advantages of the present invention will appear more fully hereinafter from a consideration of the detailed description which follows when taken together with the accompanying drawing wherein one embodiment of the invention is illustrated.

As schematically shown in the drawing, the condenser head pressure control system comprises a condensing means 10 incorporated in a novel manner in a conventional refrigeration system which includes a compressor 11, evaporator 12 and a receiver 13. The condensing means may be air cooled, atmospheric or evaporative type condensing apparatuses.

The condensing means 10 comprises a plurality of condensing circuits, each of which includes a first condensing coil 14, a second condensing coil 15 and a third condensing coil 16.

The first condensing coil 14 is connected to the compressor discharge pipe 17 to receive compressed, gaseous refrigerant from compressor 11. The first condensing coil 14 is constructed and arranged to provide, at predetermined extremely low load or low ambient air temperature condition for the locality where the installation is made, a rate of heat transfer such as to maintain a minimum condenser head pressure. For example, condensing coil 14 may be sized to maintain 84 p.s.i.g. (corresponding to R–12 refrigerant at 80° F.) condensing or saturated vapor pressure at 0° F. ambient temperature. The condensed liquid refrigerant is conducted away from condensing coil 14 by a pipe 18, which is in communication with condensing coil 14 to receive liquid refrigerant and a collecting pipe 19 to discharge the liquid refrigerant into the latter. The collecting pipe 19 communicates with receiver 13 to conduct and discharge liquid refrigerant into the latter.

The second condensing coil 15 is connected by way of bypass pipe 20 to discharge pipe 17 to receive the gaseous refrigerant in excess of that which can be condensed in condensing coil 14. A pressure regulated control valve 21 is disposed in bypass pipe 20 to control flow of fluid through the pipe. The valve 21 may be of any suitable type of pressure regulating valve, as for example, may be of the type manufactured by Controls Company of America, Folcroft, Pa., under the designation A–P, Model 239. The valve is preferably adjusted to begin to open automatically at about 10 to about 15 p.s.i.g. above the minimum head pressure value as maintained by condensing coil 14. For example, valve 21 may be set to begin to open when the head pressure is at 100 p.s.i.g. (equivalent to R–12 at 90° F.) and be fully open at 110 p.s.i.g., condensing or saturated vapor pressure. The control valve 21 functions to open and close as the pressure in bypass pipe 20 varies above and below the preset or adjusted pressure value. A connecting pipe 22 communicates condensing coil 15 with collecting pipe 19 to pass condensed refrigerant to the latter.

The third condensing coil 16 is connected via a bypass pipe 22 to discharge pipe 17 to receive gaseous refrigerant in excess of that which can be condensed by condensing coil 14 and condensing coil 15. A pressure regulating control valve 23, similar to pressure regulating control valve 21 controlling flow to condensing coil 15, is positioned in bypass pipe 22 to control flow of fluid through the pipe to condensing coil 16. The control valve 23 is preferably adjusted to begin to actuate to a fully open position at a pressure greater than control valve 21, as for example, about 110 p.s.i.g. condensing (corresponding to 97° F. temperature), and be fully open at about 120 p.s.i.g. The control valve 23 operates to modulate between fully open and fully closed positions as the pressure in bypass pipe 21 varies above and below the preset or adjusted pressure value. A pipe 24 communicates, at one end, with condensing coil 16 and, at the opposite end, with collecting pipe 19 to conduct condensed liquid refrigerant to collecting pipe 19.

A check valve means 25 is disposed in pipes 18, 22 and 24 to prevent back flow of liquid refrigerant from pipe 19 through pipes 18, 22 and 24 into the condensing coils 14, 15 and 16. This back flow of liquid refrigerant into condenser coils 15 and 16 has a tendency to occur when the condensing coils 15 and 16 are idle, such as when the condensing head pressure is at the minimum value.

As shown, receiver 13 is connected to evaporator 12 by way of a pipe 26 to deliver liquid refrigerant to the evaporator 12. An expansion device 27 is disposed in pipe 26, which device includes a temperature sensing element 28 disposed at the outlet of evaporator 12 so that refrigerant is admitted into evaporator in accordance with the load or demand. Evaporator 12 is in communication with the inlet of compressor 11 via a suction pipe 29 to pass gaseous refrigerant to the compressor for recompression and recirculation to condensing means 10.

In operation of the condenser head pressure control system, according to this invention, compressed gaseous refrigerant, such as R-12, is discharged from compressor 11, through discharge pipe 17, to condensing means 10. At extremely low loads or ambient temperature conditions, as for example 0° F., for which condensing coil 14 has been sized, refrigerant will only pass into and through condensing coil 14 at pressure, for example of about 84 p.s.i.g., saturated vapor pressure. The condensed liquid refrigerant passes from condensing coil 14 at a pressure value, such as 84 p.s.i.g. less line pressure drop, via pipe 18, into collecting pipe 19. When the load or ambient temperature increases so that condenser head pressure increases to the pressure at which valve 21 is preset, as for example about 100 p.s.i.g., the valve 21 beings to open and is fully open at about 110 p.s.i.g. to permit flow of refrigerant, through bypass pipe 20, into condensing coil 15 to thereby provide the additional condensing capacity required for the proper operation of the air conditioning or refrigerating system. The condensed liquid refrigerant discharges from condensing coil 15 and into collecting pipe 19, via pipe 22. When the load or ambient temperature increases still further to the pressure at which valve 23 is adjusted, as for example about 110 p.s.i.g., valve 23 beings to open and is fully open at about 120 p.s.i.g. to allow refrigerant flow through bypass pipe 22, into condensing coil 16, thus providing the added condensing capacity to insure the proper operation of the air conditioning or refrigerating system. With both valves 21 and 23 fully open, a head pressure is maintained at about 126 p.s.i.g. (105° F.) condensing. The condensed liquid refrigerant is passed from condensing coil 16, by way of pipe 24, into collecting pipe 19. From collecting pipe 19, the liquid refrigerant flows into receiver 13 and, thence, to evaporator 12 by pipe 26 in the amounts as determined by expansion device 27. In the evaporator 12, which also may be a liquid chiller, the refrigerant absorbs heat and is transformed into a gaseous state. The gaseous refrigerant is conducted by suction pipe 29 to compressor 11 for recompression and thence for recondensing in condensing means 10, as aforedescribed.

It is believed now readily apparent that the present invention provides a novel condenser head pressure control system which is relatively simple and inexpensive. It is a system which does not require the flooding of the condensing means to maintain a minimum head pressure as in other present control systems.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art. For example, condensing means 10 may be a single condenser having separate condensing circuits or coils 14, 15 and 16 or may be separate condenser units, each of which has one of the condensing coils 14, 15 and 16 therein without departure from the scope and spirit of the invention. In addition, it is within the contemplation of the present invention that condensing means 10 comprise only condensing coils 14 and 15. Also valves 21 and 23, while preferably of the type which modulates between fully opened and fully closed positions, may be valves which merely actuate to fully opened or fully closed positions without departing from the scope and spirit of the invention.

What is claimed is:

1. A condensing head pressure control system for air conditioning and refrigerating systems comprising a first condensing means for receiving gaseous fluid to be condensed and of a capacity to provide heat transfer sufficient to maintain a predetermined minimum head pressure at ambient air temperature, additional condensing means connected in parallel with said first condensing means, a check valve in the discharge from each of said condensing means for preventing back flow of fluid into said condenser means, and valve means for permitting flow of gaseous fluid to be condensed automatically and proportionately to said additional condensing means in accordance with predetermined head pressure above said minimum.

2. The apparatus of claim 1 wherein said valve means is a pressure responsive valve adjusted to open at about 10 p.s.i.g. to about 15 p.s.i.g. pressure above the minimum head pressure.

3. The apparatus of claim 1 wherein each of said condensing means is connected to a collector to pass liquid refrigerant to the latter.

References Cited
UNITED STATES PATENTS

| | | | |
|---|---|---|---|
| 1,790,237 | 1/1931 | King | 62—196 |
| 3,368,364 | 2/1968 | Norton | 62—196 |
| 3,370,438 | 2/1968 | Hopkinson | 62—196 |

MEYER PERLIN, Primary Examiner

U.S. Cl. X.R.

62—183, 208, 506